US009525194B2

(12) United States Patent
Ulicny et al.

(10) Patent No.: US 9,525,194 B2
(45) Date of Patent: Dec. 20, 2016

(54) REVERSIBLE ELECTRICAL CONNECTOR AND METHOD

(75) Inventors: John C. Ulicny, Oxford, MI (US); Blair E. Carlson, Ann Arbor, MI (US); Tao Xie, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1282 days.

(21) Appl. No.: 13/325,136

(22) Filed: Dec. 14, 2011

(65) Prior Publication Data

US 2013/0157104 A1    Jun. 20, 2013

(51) Int. Cl.
| | |
|---|---|
| *H01M 10/54* | (2006.01) |
| *H01M 2/20* | (2006.01) |
| *H01M 2/34* | (2006.01) |

(52) U.S. Cl.
CPC ............. *H01M 10/54* (2013.01); *H01M 2/204* (2013.01); *H01M 2/34* (2013.01); *Y02W 30/84* (2015.05); *Y10T 156/1043* (2015.01)

(58) Field of Classification Search
None
See application file for complete search history.

(56) References Cited

U.S. PATENT DOCUMENTS

| | | | | |
|---|---|---|---|---|
| 5,447,809 A | * | 9/1995 | Hafner | H01M 2/0272 429/165 |
| 5,580,493 A | * | 12/1996 | Chu | H01B 1/12 174/68.1 |
| 5,800,939 A | * | 9/1998 | Mishina et al. | 429/57 |
| 7,033,668 B2 | * | 4/2006 | Schumann | B03C 3/60 156/60 |

(Continued)

FOREIGN PATENT DOCUMENTS

| | | |
|---|---|---|
| CN | 1803905 A | 7/2006 |
| JP | 62086664 A * | 4/1987 |

(Continued)

OTHER PUBLICATIONS

Tao Xie, Xingcheng Xiao, "Self-Peeling Reversible Dry Adhesive System", Chem. Mater 2008, pp. 2866-2868, vol. 20, Apr. 5, 2008.

(Continued)

*Primary Examiner* — Rena L Dye
(74) *Attorney, Agent, or Firm* — Quinn Law Group, PLLC

(57) ABSTRACT

A method of reversibly connecting two substrates includes positioning an electrically conductive adhesive connector including a shape memory polymer (SMP) between the substrates, heating the connector to a temperature higher than the SMP transition temperature, applying a load and cooling the connector below the transition temperature to transform the connector to a conforming shape to form an adhesive bond attaching the substrates and providing an electrical connection therebetween. The method may include disconnecting the connector from the substrates by heating the connector above the SMP transition temperature, which may disrupt the electrical connection between the substrates. The connector may be a battery tab connector configured to connect a battery cell to another battery cell or a terminal. The connector may be releasable from the battery tab such that the battery tab is reusable after removal of the connector. The connector may be multi-layer and generally arcuate in a permanent shape.

17 Claims, 2 Drawing Sheets

(56) References Cited

U.S. PATENT DOCUMENTS

| | | |
|---|---|---|
| 7,976,665 B2 | 7/2011 | Xie et al. |
| 2002/0064708 A1* | 5/2002 | Asahina et al. .............. 429/160 |
| 2007/0020509 A1 | 1/2007 | Kim |
| 2008/0257485 A1 | 10/2008 | Xie et al. |
| 2008/0257486 A1 | 10/2008 | Xie et al. |
| 2008/0262188 A1 | 10/2008 | Xie et al. |
| 2008/0289757 A1 | 11/2008 | Xie et al. |
| 2008/0292848 A1* | 11/2008 | Xie et al. ...................... 428/174 |
| 2009/0280330 A1 | 11/2009 | Xie et al. |
| 2009/0286150 A1* | 11/2009 | Nelson ............... G06K 19/0702 429/162 |
| 2010/0022710 A1 | 1/2010 | Xie et al. |
| 2010/0028686 A1 | 2/2010 | Xie |
| 2010/0035049 A1 | 2/2010 | Xie |
| 2010/0190011 A1* | 7/2010 | Cheng et al. ................. 428/413 |
| 2010/0203342 A1 | 8/2010 | Xie et al. |
| 2010/0212820 A1 | 8/2010 | Xie et al. |
| 2011/0183148 A1 | 7/2011 | Kia et al. |

FOREIGN PATENT DOCUMENTS

| | | |
|---|---|---|
| WO | 2010118082 A1 | 10/2010 |
| WO | 2011026596 A2 | 3/2011 |

OTHER PUBLICATIONS

Ruomiao Wang, Tao Xie, "Shape Memory—and Hydrogen Bonding-Based Strong Reversible Adhesive System" Langmuir Letter, pp. 2999-3002, Feb. 2, 2010.

Tao Xie, Ingrid A. Rousseau, "Facile Tailoring of Thermal Transition Temperatures of Epoxy Shape Memory Polymers", Polymer 50, pp. 1852-1856, Feb. 28, 2009.

Tao Xie, Xingcheng Xiao, Yang-Tse-Cheng, "Revealing Triple-Shape Memory Effect by Polymer Bilayers" Macromolecular Rapid Communications, pp. 1823-1827, Aug. 4, 2009.

Tao Xie, "Tunable Polymer Multi-Shape Memory Effect", Nature, vol. 464, pp. 267-270, Mar. 11, 2010, Macmillian Publishers Limited.

* cited by examiner

REVERSIBLE ELECTRICAL CONNECTOR AND METHOD

TECHNICAL FIELD

The present invention relates to a reversible electrical connector for the attachment of electrically conductive substrates including battery tabs of a multicell battery.

BACKGROUND

Battery packs may consist of a plurality of battery cells, where the tabs of the battery cells are conductively joined to one another to form the battery pack. The battery tabs may be joined by resistance or laser welding to form an electrically conductive path between battery cells or between a battery cell and a terminal of the battery. Variability in the welding process may result in variation in the welded connections between the tabs which may cause variation in the electrical conductivity of the battery pack. The battery tab is irreversibly modified by the welding process such that upon separation of one battery tab from another, the welded battery tabs may become damaged or deteriorated such that the tabs and corresponding battery cells are no longer usable.

Multicell battery packs, e.g., battery packs containing multiple battery cells which are electrically connected to one another, may be used in automotive applications including hybrid vehicles. At the end of the useful life for the automotive application, a battery cell in a multicell battery pack may retain a significant percentage of its capacity such that the battery cell may be recycled to or reused in a lighter duty application with lower voltage and/or capacity requirements. Reuse of the battery cell may require disassembly of the battery cell from the battery with the battery tab substantially intact, e.g., in an undamaged or reusable state. Welded battery tabs may be damaged when separating the welded connection to the extent that the tabs are not reusable, such that the battery cell cannot be recycled, e.g., cannot be attached to another battery cell or terminal or reconfigured into another battery pack. Additionally, deterioration and/or damage to the battery tab during separation of the welded joint may limit the ability to recover materials from the damaged battery cell, by affecting the ability to deconstruct the battery cell for materials recycling.

SUMMARY

A thermo-reversible adhesive connector configured to releasably attach the battery tabs of battery cells, and a method for reversibly connecting the tabs of battery cells using the releasable connector is provided herein. The electrically conductive connector described herein allows for recycling of battery packs and battery pack cells by providing a simple, releasable means of connecting the battery cell tabs which when released or reversed provides a recyclable battery cell including a reusable battery tab, and a reusable connector. In one example, the battery packs may be battery packs initially used in a battery of a hybrid vehicle, wherein at the end of useful vehicle service life each battery pack and/or battery cell may retain a significant portion of its capacity such that the battery pack and/or battery cell may be recycled and repurposed to other applications requiring lesser capacity than the initial vehicle battery application. By providing a releasable attachment for battery cell tabs, the battery cell can be detached at the end of the vehicle service life without compromising the integrity of the battery tab.

A releasable battery tab connector is provided. The releasable connector may have a multi-layer construction including at least one layer comprised of a shape memory polymer (SMP) interposed between adhesive layers, which may be dry adhesive layers. As used herein, dry adhesives refer to intrinsically sticky materials that do not rely on melting or solvent to activate their adhesion properties. The SMP and adhesive layers are electrically conductive making the releasable connector electrically conductive. The SMP layer has a generally C-shaped or arcuate permanent shape facilitating detachment of the connector from the battery tab. The connector may be positioned between adjacent battery tabs and a force applied after heating the connector to a temperature above the SMP transition temperature such that the connector transforms into a temporary shape conforming with the battery tab surface, which may be a substantially flat shape, then cooled below the transition temperature while under the applied force to attach the battery tabs and provide an electrically conductive path between the battery tabs.

The connector may be detached from the battery tab by activating the connector above the SMP transition temperature such that the connector recovers its permanent shape, causing the adhesive layer and the connector to peel away from the surface of the battery tab, substantially disconnecting the connector from the battery tab and battery cell. The connection is reversed such that the battery tab when disconnected is substantially unmodified and/or in a condition rendering the attached battery cell suitable for recycling. In one example, the releasable battery tab connector may have a single layer construction including a shape memory polymer, wherein the shape memory polymer is adhesive.

A method of reversibly connecting two electrically conductive substrates includes positioning an electrically conductive adhesive connector including a shape memory polymer (SMP) between the substrates, heating the connector to a temperature higher than the SMP transition temperature, and applying a load and cooling the connector below the transition temperature while under load to transform the connector to a conforming shape, thereby forming an adhesive bond attaching the substrates and providing an electrical connection therebetween. The method may include disconnecting or releasing the connector from the substrates by heating the connector above the SMP transition temperature, wherein disconnecting the connector includes progressively peeling the adhesive portion of the connector from the substrate. Transformation of the connector from the temporary conforming shape to the curved permanent shape may generate a detaching force sufficient to initiate and progress detachment of the adhesive layer and the connector from the substrate.

Disconnecting the connector may disrupt the electrical connection between the substrates, such that the connector may be configured as a limit switch or fuse activated when the connector is heated to a temperature limit corresponding to the SMP transition temperature. The connector may be reattached after disconnecting, to reattach the substrates and reestablish the electrical connection, wherein the connector may act as a circuit breaker. The connector may be a battery tab connector configured to connect a battery cell to another battery cell or a terminal. The connector may be releasable from the battery tab such that the battery tab and/or the connector is reusable after removal of the connector.

The above features and other features and advantages of the present invention are readily apparent from the following detailed description of the best modes for carrying out the invention when taken in connection with the accompanying drawings.

DETAILED DESCRIPTION

Figure 1:
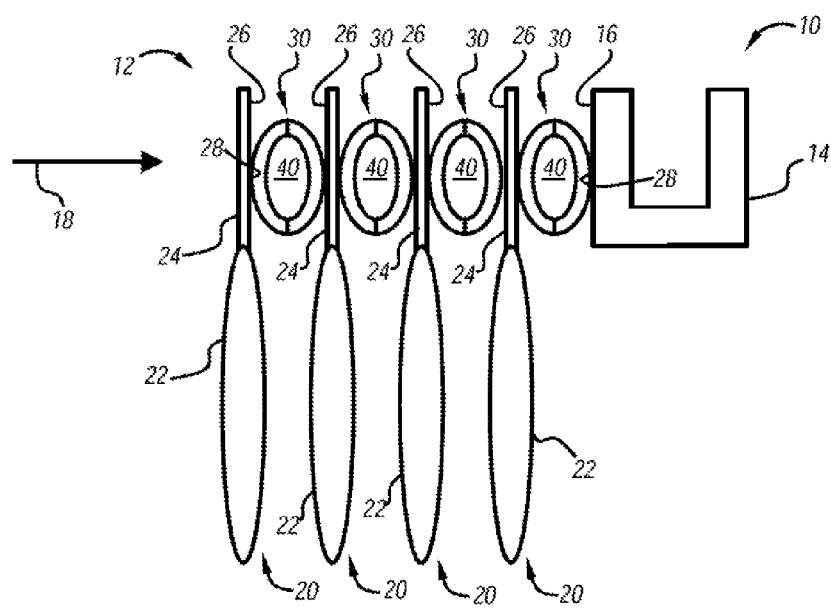
FIG. 1 is a schematic illustration of a side view of a battery pack including a plurality of reversible connectors having a first shape.

Referring to the drawings wherein like reference numbers represent like components throughout the several figures, the elements shown in FIGS. 1-5C are not necessarily to scale or proportion. Accordingly, the particular dimensions and applications provided in the drawings presented herein are not to be considered limiting. FIG. 1 shows a battery 10 including a battery pack 12. The battery 10 may be referred to herein as a battery assembly. The battery 10 may include a plurality of battery packs 12. A terminal 14, which may also be referred to herein as a bus bar or u-channel, may be connected to one or more battery packs 12 to conduct electric energy provided by the battery pack 12 in the battery 10. The battery 10 may be configured for use in a hybrid vehicle (not shown), for example, to provide electrical energy to one or more systems of the hybrid vehicle which may include the vehicle powertrain system.

Figure 2:
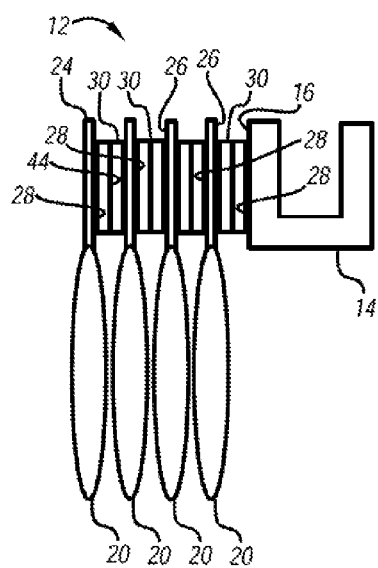
FIG. 2 is a schematic illustration of a side view of the battery pack of FIG. 1 with the reversible connectors having a second shape such that the battery cells are connected.

The battery pack 12 includes a plurality of battery cells 20. In one example, the battery cell 20 may be lithium-polymer or lithium ion type (Li-Ion) cell, and/or may be configured as a pouch cell or prismatic cell. Each battery cell 20 includes a battery body 22 including an electrode (not shown) and at least one battery tab 24. The battery tab 24 is connected to the battery body 22 and/or to the electrode in the battery body 22 and may be configured as an electrically conductive foil tab. The battery tab 24, which may also be referred to herein as a substrate or an electrically conductive substrate, defines at least one interface surface 26, which may also be referred to herein as a tab interface, a tab interface surface, a substrate interface, or a substrate surface. The battery tab 24, e.g., the conductive substrate, may be made of an electrically conductive material. In one example, the battery tab 24 may be comprised of a metallic material, which may include, for example, one or more of copper, silver, and iron. A reversible connector 30 including a shape memory polymer in a permanent shape may be interposed between adjacent tabs 24 as shown in FIG. 1, and converted to a temporary shape as shown in FIG. 2 to electrically connect, e.g., to provide an electrically conductive path between the adjacent tabs 24 by adhering to the interface surfaces 26. The battery pack 12 may be electrically connected to the battery terminal 14, by interposing a reversible connector 30 in a permanent curved shape between the terminal 14 and an adjacent battery tab 24, as shown in FIG. 1, and converting the connector 30 to a temporary conforming shape as shown in FIG. 2 to provide an electrically conductive path between the tab 24 and the terminal 14, thereby electrically connecting the battery pack 12 to the terminal 14. The terminal 14, which may also be referred to herein as a substrate or an electrically conductive substrate, defines at least one interface surface 16, which may also be referred to herein as a terminal interface, a terminal interface surface, a substrate interface, or a substrate surface.

The connector 30 may be referred to herein as a reversible connector, a releasable connector, an adhesive connector, a thermo-reversible connector, a detachable connector or a reversible attachment. The connector 30 is electrically conductive and adhesive, e.g., the connector 30 has adhesive properties such that the connector 30 may adhere to a substrate such as the substrates 14, 24, thus defining a contact area 28 between the connector 30 and the substrate 14, 24. The contact area 28 may define an electrically conductive path formed between the connector 30 and the substrate. The connector 30 may be converted from the curved permanent shape shown in FIG. 1 to the temporary generally flat and/or conforming shape shown in FIG. 2 by applying a force 18 to the battery tabs 24 and the connectors 30 interposed therebetween while the connectors 30 are at a temperature above the transition temperature of the shape memory polymer comprising the connectors 30, such that each of the connectors 30 conforms to and forms an attachment to the interface surfaces 16, 26 adjacent to the connector 30 to provide an electrically conductive joint or path generally defined by the contact area 28 between the substrates adjacent to the connector 30. The substrates adjacent to the connector 30 may be, for example, adjacent tabs 24, or the terminal 14 and a tab 24 adjacent to the terminal 14. The connectors 30 are subsequently cooled below the transition temperature of the shape memory polymer prior to removing the applied force 18 such that each of the cooled connectors 30 retains its temporary shape, as shown in FIG. 2, thus electrically connecting the plurality of battery cells 20 to form the battery pack 12, and electrically connecting the battery pack 12 thus formed to the terminal 14.

Figure 3:
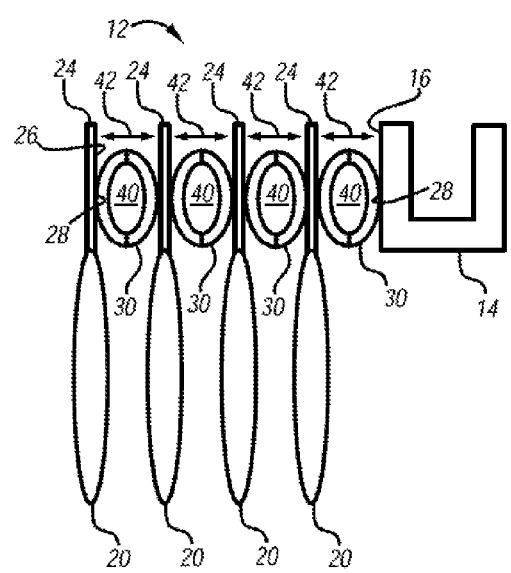
FIG. 3 is a schematic illustration of a side view of the battery pack of FIG. 1 with the reversible connectors returned to their first shape such that the battery tabs are disconnected.

As shown in FIG. 3, the connections formed as described for FIG. 2 may be reversed such that each of the connectors 30 may be easily detached from the interfaces 16, 26 by elevating the temperature of the connector 30 above the transition temperature of the shape memory polymer comprising the connector 30, such that the connector 30 reverts to its permanent curved shape and in so doing exerts a detaching force 42 initiating detachment of the connector 30 by causing the connector 30 to progressively pull and/or peel away from the interface 16, 26 thus minimizing or substantially eliminating the contact area 28 between the connector 30 and the interface 16, 26 allowing removal of the connector 30 from the interface 16, 26 without damaging the tab 24, e.g., without rendering the tab 24 unusable. The disconnected battery cell 20 including the battery tab 24 in a reusable condition may be recycled or reused in another application, where reuse may include forming an electrical connection including the battery tab 24. The removed connector 30 may be recycled or reused in another application, where reuse may include forming another electrical connection using the removed connector 30.

Figure 4A:
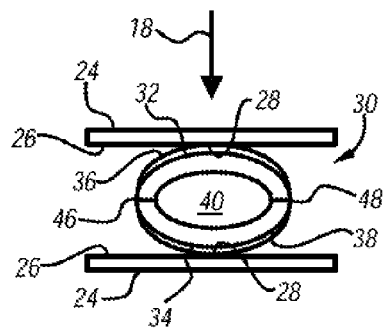
FIG. 4A is a schematic illustration of a side view showing a first example of the connector of FIG. 1.
Figure 4B:
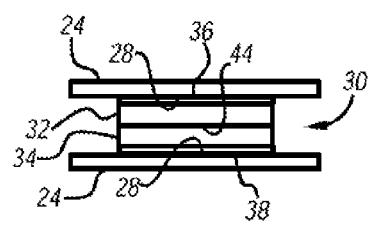
FIG. 4B is a schematic illustration of a side view showing a first example of the connector of FIG. 2.
Figure 4C:
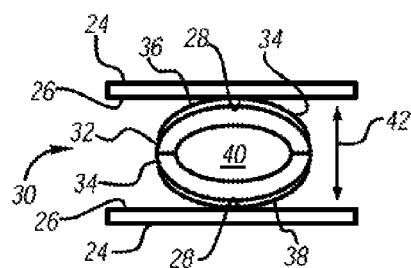
FIG. 4C is a schematic illustration of a side view showing a first example of the connector of FIG. 3.

Referring to FIGS. 4A-4C, an example of a reversible connector 30 is shown. The reversible connector 30 as shown in FIGS. 4A-4C may be configured as a thermo-reversible multi-layer connector. In the example shown, the connector 30 is configured as a quadruple layer connector 30 including two layers or portions of a shape memory polymer (SMP) 32, 34 and two layers or portions of adhesive 36, 38. The adhesive layers, which may be referred to as a first adhesive layer 36 and a second adhesive layer 38, or collectively as the adhesive layers, may be configured as an elastomeric dry adhesive. The SMP layers may be referred to as a first SMP layer 32 and a second SMP layer 34, or collectively as the SMP layers. Each of the SMP layers 32, 34 and the adhesive layers 36, 38 is electrically conductive, due to the electrical conductivity of the respective SMP and adhesive and/or due to electrically conductive filler included in the layer. The SMP may be characterized by a glass transition temperature, which may be referred to herein as a transition temperature or an SMP transition temperature.

Each SMP layer 32, 34 is configured with a generally arcuate or C-shape curvature when the SMP layer is in its permanent shape. The SMP layers 32, 34 are positioned adjacent to each other such that the curvature of the SMP layers 32, 34 are opposing to define an opening or cavity 40 therebetween, as shown in FIG. 4A, and such that the outermost surface of each of the SMP layers 32, 34 is generally convex. The first adhesive layer 36 may be positioned adjacent to the first SMP layer 32 and may be configured to extend across the outermost surface of the SMP layer 32 to edges 46, 48. The second adhesive layer 38 may be positioned adjacent to the second SMP layer 34 and may be configured to extend across the outermost surface of the SMP layer 34 to edges 46, 48.

In one example, the connector 30 is positioned, as shown in FIG. 4A, between a first electrically conductive substrate, which may be a first battery tab 24 and a second electrically conductive substrate, which may be a second, or adjacent battery tab 24. Small or minimal contact areas 28 may be defined between the adhesive layers 36, 38 of the connector 30 and the interface surfaces 26 of the adjacent tabs 24, due to adhesion of the curved adhesive layer to the surface 26. The minimal adhesion provided by the contact areas 28 shown in FIG. 4A may assist in assembling the connector 30 and tabs 24 by maintaining the connector 30 in position between the adjacent tabs 24 prior to thermal activation of the connector 30 and application of the force 18.

The connector 30 is activated by heating the connector 30 to a temperature above the glass transition temperature of the SMP of the first and second SMP layers 32, 34, and imposing a force or load 18 on the connector 30 as shown in FIG. 4A while the connector 30 is at a temperature above its transition temperature, causing the connector 30 to deform to a temporary shape shown in FIG. 4B as the connector 30 is compressed between the adjacent tabs 24. Under pressure and at a temperature above the SMP transition temperature, the connector 30 deforms and complies to the adjacent tabs by flattening the curvature of each of the SMP layers 32, 34 such that each SMP layer 32, 34 and the connector 30 assumes a generally flattened shape. As the connector 30 flattens, each of the adhesive layers 36, 38 flattens and adheres to the adjacent interface surface 26, significantly increasing the contact area 28 between the connector 30 and the adjacent tabs 24, and adhering the connector 30 to the interface surface 26. The connector 30 is cooled to a temperature below the SMP transition temperature while the load 18 continues to be applied, thereby transforming each of the SMP layers 32, 34 of the connector 30 from the permanent curved C-shape shown in FIG. 4A to the temporary flattened shape shown in FIG. 4B. As used herein, the permanent shape may be referred to as the curved or arcuate shape, and the temporary shape may be referred to as the flattened shape, the generally flat shape, or the conforming shape. In one example, the connector 30 may be cooled to about 25° C. After the connector 30 has cooled below the transition temperature, the load 18 is removed.

Upon cooling under the load, the cavity 40 may become very small or insignificant, or may disappear altogether such that the innermost surfaces of the SMP layers 32, 34 form the conductive interface 44. In one example, the connector 30 may include a fifth layer, which may be an electrically conductive adhesive layer (not shown) positioned adjacent to the innermost surface of at least one of the SMP layers 32, 34, which may form the conductive interface 44 between the SMP layers 32, 34. The adhesive layer forming the interface 44 may be sufficiently adhesive to bond or join the inner surfaces of the SMP layers 32, 34 to form the interface 44 and sufficiently weak to allow separation of the inner surfaces of the SMP layers 32, 34 when the connector 30 is activated above the SMP transition temperature, e.g., when the connection is reversed to release the connector 30.

The adhesive layers 36, 38 and the conforming temporary shape of the SMP layers 32, 34 of the connector 30 form a strongly adhesive bond between the battery tabs 24, as shown in FIGS. 2 and 4B. The connector 30 in the conforming temporary shape provides an electrical connection between the battery tabs 24 bonded to the connector 30, which includes an electrical path defined by at least the contact areas 28 and the connector 30. The electrical connection provided by the connector 30 configured as shown in FIGS. 2 and 4A provides an electrical path which, in comparison to a welded electrical connection, e.g., an electrical connection formed by welding the tabs 24 directly to each, may be more consistent in configuration and electrical conductivity, and of a greater cross-sectional area than a welded electrical connection, thus providing a connection less susceptible to detrimental conditions which may be exhibited by a welded electrical connection which may include variability in conductivity, welding discontinuities, and susceptibility to overheating or current overload.

The connected battery tabs 24 may be separated from one another or from the terminal 14 by reversing the connection provided by the connector 30 in the temporary shape, as shown in FIG. 4C. The connection may be reversed by heating the connector 30 to a temperature above the glass transition temperature of the SMP of the SMP layers 32, 34 without constraining the connector 30, e.g., by heating the connector 30 in the absence of an applied load. Upon heating above the transition temperature, each of the SMP layers 32, 34 begins to deform from the flattened temporary shape and to recover the curved permanent shape. As each of the SMP layers 32, 34 transitions to the curved permanent shape, the changing shape of the connector 30 exerts a detaching force 42 against the tabs 24 connected by the connector 30 as shown in FIGS. 3 and 4C, which causes the adhesive layers 36, 38 to peel away from the surfaces 26 of the tabs 24 beginning from near the outer edges 46, 48 of the connector 30. When the detaching force is employed in a peel-off mode, complete detachment is achieved gradually by overcoming small adhesion forces corresponding to very small areas. Thus, the adhesion is easily reversed. As the SMP layers 32, 34 recover their curved permanent shape, the cavity 40 forms between the SMP layers 32, 34 contributing to the detaching force 42, and the adhesive layers 36, 38 continue to progressively peel away, minimizing and/or substantially eliminating the contact areas 28 to complete the reversal of the connection, e.g., substantially detaching the connector 30 from the tab 24, and/or minimizing the contact areas 28 such that the connector 30 may be detached from the interface 26 without damaging and/or rendering the tab 24 unusable. The detached battery cell 20 may be recycled, which may include reusing the cell 20 and/or electrically reconnecting the detached tab 24 to another substrate, which may be another battery tab 24 or terminal 14, using a connector such as the connector 30, or by other means. The detached connector 30 may be recycled, which may include reusing the detached connector 30 to provide an electrical and adhesive connection between two substrates 24.

Figure 5A:
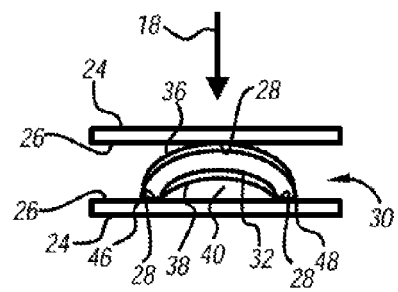
FIG. 5A is a schematic illustration of a side view showing a second example of the connector of FIG. 1.
Figure 5B:
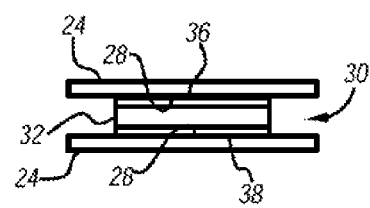
FIG. 5B is a schematic illustration of a side view showing a second example of the connector of FIG. 2.
Figure 5C:
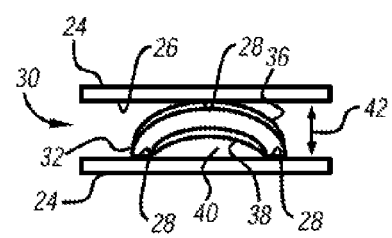
FIG. 5C is a schematic illustration of a side view showing a second example of the connector of FIG. 3.

Referring now to FIGS. 5A-5C, shown is another example configuration of the connector 30. The reversible connector 30 as shown in FIGS. 5A-5C may be configured as a thermo-reversible multi-layer connector. In the example shown, the connector 30 is configured as a triple layer connector 30 including one layer or portion of a shape memory polymer (SMP) 32 and two layers or portions of adhesive 36, 38. The adhesive layers 36, 38 may be configured as an elastomeric dry adhesive. The SMP layer 32 and the adhesive layers 36, 38 are each electrically conductive, due to the electrical conductivity of the respective SMP and adhesive and/or due to electrically conductive filler included in the layer. The SMP is characterized by a glass transition temperature.

The SMP layer 32 is configured with a generally arcuate or C-shape curvature when in its permanent shape. The SMP layer 32 is positioned adjacent to the tab 24 such that the curvature of the SMP layer 32 defines an opening 40 therebetween, as shown in FIG. 5A, and such that the surface of the SMP layer 32 opposite the opening 40 is generally convex. The first adhesive layer 36 may be positioned adjacent to one side of the SMP layer 32 and may be configured to extend across the outermost surface of the SMP layer 32 to edges 46, 48. The second adhesive layer 38 may be positioned adjacent to the opposing side of the SMP layer 32 and may be configured to extend across the outermost surface of the SMP layer 32 to edges 46, 48.

In one example, the connector 30 is positioned, as shown in FIG. 5A, between a first electrically conductive substrate, which may be a first battery tab 24 and a second electrically conductive substrate, which may be a second, or adjacent battery tab 24. Small or minimal contact areas 28 may be formed between adhesive layers 36, 38 of the connector 30 and the interface surface 26 of the tab 24. The minimal adhesion provided by the contact areas 28 shown in FIG. 5A may assist in assembling the connector 30 and tabs 24 by maintaining the connector 30 in position between the adjacent tabs 24 prior to thermal activation of the connector 30 and application of the force 18.

The connector 30 is activated by heating the connector 30 to a temperature above the glass transition temperature of the SMP of the SMP layer 32, and a load or force 18 is imposed on the connector 30 as shown in FIG. 5A and while the connector 30 is at a temperature above its transition temperature, causing the connector 30 to deform to a temporary shape shown in FIG. 5B as the connector 30 is compressed between the adjacent tabs 24. Under pressure and at a temperature above the SMP transition temperature, the connector 30 deforms and complies to the adjacent tabs by flattening the curvature of the SMP layer 32 such that the connector 30 assumes a generally flattened shape. As the connector 30 flattens, each of the adhesive layers 36, 38 flattens and adheres to the adjacent interface surface 26, significantly increasing the contact area 28 between the connector 30 and the adjacent tabs 24, and adhering the connector 30 to the interface surface 26. The connector 30 is cooled to a temperature below the SMP transition temperature while the load 18 continues to be applied, thereby transforming the SMP layer 32 of the connector 30 from the permanent C-shape shown in FIG. 5A to the temporary flattened shape shown in FIG. 5B. In one example, the connector 30 may be cooled to about 25° C. After the connector 30 has cooled below the transition temperature, the load 18 is removed. Upon cooling under the load 18, the opening 40 may become very small or insignificant, or may disappear altogether as the adhesive layer 38 conforms to the surface 26. The adhesive layers 36, 38 and the conforming temporary shape of the SMP layer 32 of the connector 30 form a strongly adhesive bond between the battery tabs 24, as shown in FIG. 5B. The connector 30 in the conforming temporary shape provides an electrical connection between the battery tabs 24 bonded to the connector 30, which includes an electrical path defined by at least the contact areas 28 and the connector 30. The electrical connection provided by the connector 30 configured as shown in FIG. 5A provides an electrical path which may be more consistent in configuration and electrical conductivity, and of a greater cross-sectional area than a welded electrical connection, thus providing a connection less susceptible to detrimental conditions which may be exhibited by a welded electrical connection which may include variability in conductivity and susceptibility to overheating.

The connected battery tabs 24 may be separated from one another or from the terminal 14 by reversing the connection provided by the connector 30 in the temporary shape, as shown in FIG. 5C. The connection may be reversed by heating the connector 30 to a temperature above the glass transition temperature of the SMP of the SMP layer 32 without constraining the connector 30, e.g., by heating the connector 30 in the absence of an applied load. Upon heating above the transition temperature, the SMP layer 32 begins to deform from the flattened temporary shape to the curved permanent shape. As the SMP layer 32 transitions to the curved permanent shape, the changing shape of the connector 30 exerts a detaching force 42 against the tabs 24 connected by the connector 30 as shown in FIG. 5C, which causes the adhesive layer 38 to peel away from the surface 26 beginning from near the outer edges 46, 48 of the connector 30. When the detaching force is employed in a peel-off mode, complete detachment is achieved gradually by overcoming small adhesion forces corresponding to very small areas. Thus, the adhesion is easily reversed. As the SMP layer 32 recovers its curved permanent shape, the cavity 40 forms between the SMP layer 32 contributing to the detaching force 42, and the adhesive layer 38 progressively peels away, minimizing and/or substantially eliminating the contact areas 28 to complete the reversal of the connection, e.g., substantially detaching the connector 30 from the tab 24, and/or minimizing the contact areas 28 such that the connector 30 may be detached from the interface 26 without damaging and/or rendering the tab 24 unusable. The detached battery cell 20 may be recycled, which may include reusing the cell 20 and/or electrically connecting the detached tab 24 using a connector such as the connector 30, or by other means. The detached connector 30 may be recycled, which may include reusing the detached connector 30 to provide an electrical and adhesive connection between two substrates 24.

By way of example, the shape memory polymer comprising the SMP layers 32, 34 may be an epoxy. By way of example, the components of the dry adhesive layers 36, 38 and/or the components of the SMP layers 32, 34 may include a rigid epoxy and a flexible epoxy. The range of possible crosslinking chemistries which may be used to achieve a dry adhesive or shape memory polymer may include alpha, omega-diaminoalkanes, organic multi-carboxylic acid, anhydride, or catalytic (as in imidazole type) crosslinking reactions. There are many different ways to achieve the appropriate relationships between the molecular properties. For example, the dry adhesives or shape memory polymers may include a rigid epoxy, an epoxy extender, and a crosslinking agent; or a rigid epoxy, a flexible crosslinking agent, and a flexible epoxy; or a rigid epoxy, a rigid crosslinking agent, and a flexible epoxy; or a rigid epoxy, a flexible epoxy, and a catalytic curing agent; or a rigid epoxy, a crosslinking agent, and a diluent; or a flexible epoxy, a crosslinking agent, and a diluent; or a rigid epoxy and a flexible crosslinking agent; or a flexible epoxy and a catalytic curing agent; or a flexible epoxy and a crosslinking agent; and wherein the rigid epoxy is an aromatic epoxy having at least two epoxide groups, the flexible epoxy is an aliphatic epoxy having at least two epoxide groups, the epoxy extender has one epoxide group, and the crosslinking agent is one of a multi-amine, an organic multi-carboxylic acid, or an anhydride, and the diluent is a monoamine or a mono-carboxylic acid. In various example configurations, the catalytic curing agent (or catalytic cure) promotes epoxy-to-epoxy or epoxy-to-hydroxyl reactions. The catalytic curing agent may include, but is not limited to, tertiary amines, amine salts, boron trifluoride complexes, or amine borates. In one example, the components of the dry adhesive may be present in an amount sufficient to provide, upon curing of the composition, a dry adhesive having a glass transition temperature ($T_g$) of −90° C. to 200° C. and having a pull-off strength of 1-200 N/cm² from a substrate. In another example, the dry adhesive may have a glass transition temperature of −90° C. to 25° C.

One or more of the SMP layers 32, 34 and/or the adhesive layers 36, 38 may be configured to include a filler such that the SMP layers 32, 34 and the adhesive layers 36, 38 are each electrically conductive. The filler may be, for example, a metallic filler which may contain one of more of iron, copper, silver, or other conductive metals. The filler may be provided in powder form and may have a concentration range of 30% volume or greater to provide electrical conductivity to the SMP layers 32, 34 and/or the adhesive layers 36, 38. The filler may be thermally conductive, to facilitate conductive and/or inductive heating and/or cooling of the connector 30, for example, to heat the connector 30 during transformation from the permanent shape to the temporary shape, or to thermally activate the connector 30 to disconnect or detach, by heating the connector 30 above its transition temperature when the connector is in its temporary shape. The thermal conductive properties of the filler may increase the temperature of the connector 30, for example, when the connector 30 is conducting electricity from battery tabs 24 to which the connector 30 is attached, e.g., during operation of the battery pack 12, by inductively heating the connector 30. Other types and forms of electrically conductive fillers, which may also be thermally conductive, may be used. For example, carbon-based fillers such as carbon black, carbon fibers, and/or carbon nanotubes may be used.

Numerous shape memory polymers may be utilized, and the examples provided herein are not intended to be limiting. In one example, the components of the shape memory polymer composition may be present in an amount sufficient to provide, upon curing of the composition, an epoxy shape memory polymer having a change in storage modulus of 2 to 3 orders of magnitude before and after its glass transition. In one example, the shape memory polymer has a $T_g$ of 25° C. to 200° C. For example, starting with a typical aromatic diepoxy/diamine system with a $T_g$ of about 90° C., the aromatic epoxy component is replaced systematically with an aliphatic diepoxy to yield a series of epoxy shape memory polymers with glass transition temperatures ranging from 3° C. to 90° C. As such, a shape memory polymer may be tailored for use with a dry adhesive as desired for a particular application operated within certain temperature ranges.

In one example, the shape memory polymer comprising each of the SMP layers 32, 34 may be characterized by a transition temperature which is higher than the operating temperature of the battery 10. In one example, the normal operating temperature of the battery 10 may be in the range of 25° C. to 35° C., with a specified or anticipated maximum operating temperature of approximately 45° C. The shape memory polymer and adhesive, in this example, may be configured with a transition temperature above the normal operating temperature, such that the connector 30 in its connected condition, e.g., in the temporary shape, will not be subjected to temperatures above the transition temperature, to prevent activation of the connector 30 and transformation to its detached permanent shape during normal battery operation. The SMP and adhesive of the connector 30 may, by example, be configured with a transition temperature above the maximum operating temperature, to prevent activation and detachment of the connector 30 under battery operating conditions up to this temperature.

In one example, the connector 30 may be configured to provide protection of the battery cells 20 and battery 10 from an over-amperage, current overload, and/or over-heating condition, by being configured as an electrical switch, a limit switch, a circuit breaker, or a fuse. In this example, the SMP of the connector 30 may be configured to have a transition temperature which corresponds to a temperature limit established for at least one of the battery cell 20, the battery pack 12 and the battery 10, wherein the transition temperature may be equal to or less than the temperature limit. The connector 30, when heated to a temperature at or above the temperature limit, is heated above its transition temperature and activated to transform from the connected temporary shape to its permanent shape, detaching the connector 30 from the battery tabs 24, thereby disconnecting the battery cells 20 including the battery tabs 24 from each other, and from the battery pack 12 and battery 10, and discontinuing or disrupting the current flow between the battery tabs 24. By disconnecting the battery cells 20, the cells 20 may be automatically disassembled (detached) and/or electrically shut off when the temperature limit is exceeded, such that the electrical connection between the cells 20 is disrupted, which may protect the disconnected cell 20 from deterioration or damage to maintain the integrity and functionality of the cell 20.

The temperature limit may be specified to avoid an overheating condition of at least one of the battery cell 20, the battery pack 12 and the battery 10. The temperature limit may correspond to an ambient operating temperature limit of the battery 10, such that the connector 30 may be heated to its transition temperature when the operating temperature of the battery 10, the temperature of the surroundings of connector 30 exceeds the temperature limit. The temperature limit may correspond to a maximum operating temperature of the battery cell 20, e.g., a temperature above which the battery cell 20 in a connected state may experience deterioration or damage or a reduction in cell integrity. The temperature limit may correspond to an electrical condition, such as a current overload, power surge, open circuit, or other condition which may cause an increase in the current conducted through the connector 30 which may be damaging to at least one of the battery cell 20, the pack 12 or the battery 10. The increased current may cause an increase in the temperature of the connector 30, for example, through resistive heating of the conductive filler or other materials of the connector 30, such that the temperature of the connector 30 meets or exceeds the temperature limit, activating the connector 30 to transform to its temporary shape, thereby detaching from the battery tabs 24 and disconnecting the cells 20, such that current flow to and from the cell 20 ceases or is substantially disrupted or discontinued. The connector 30 may be configured as a fuse wherein when the connector 30 is exposed to temperatures at or above the temperature limit, the connector 30 opens, e.g., is activated to transform to its permanent shape, reopening the cavity 40 and substantially eliminating the contact areas 28. The connector 30 may function as a circuit breaker, such that after being activated by a temperature above the temperature limit and opening the electrical circuit between the battery tabs 24, the connector 30 may be reheated above the transition temperature, a force 18 reapplied to deform the connector 30 into the conforming temporary shape, and cooled below the transition temperature while the force 18 is applied to reconnect the battery tabs 24 using the connector 30, such that the battery tabs 24 become reattached and an electrically conductive path is reestablished therebetween.

The examples provided herein are not intended to be limiting. Other configurations of the electrically conductive reversible connector may be used. For example, the SMP may have sufficient adhesive properties such that the connector may be configured as a single SMP layer connector or a double SMP layer connector, wherein the SMP layer is in direct contact with and attached to the substrate in a connected condition. For example, the SMP may be a cross-linked polymer, such as a crosslinked vinyl acetate polymer or an ethylene-vinyl acetate (EVA) polymer exhibiting adhesive properties, such that the SMP layer in this instance may provide the combined functionality of the SMP layer 32, 34 and the adhesive layer 36, 38. The battery pack 12 may be a non-automotive battery pack, and/or the battery 10 may be configured for non-automotive applications. The battery cell 20 may be of any suitable configuration, and is not limited to the pouch or prismatic battery cell configurations described as examples herein. The substrate 24 may be an electrically conductive substrate other than a battery tab or battery element, and may be a non-battery element, which may be connected using the reversible connector 30 to establish an electrically conductive path between the substrate 24 and the connector 30.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method comprising:
providing an electrically conductive adhesive connector including a shape memory polymer having a glass transition temperature;
providing a first substrate and a second substrate, wherein the first substrate and the second substrate are electrically conductive;
positioning the connector adjacent to the first substrate and the second substrate;
heating the connector to a temperature higher than the glass transition temperature of the shape memory polymer;
applying a load on the connector to transform the connector to a conforming shape while cooling the connector to a temperature lower than the glass transition temperature;
wherein the connector in the conforming shape:
forms an adhesive bond between the connector and the first and second substrates to operatively attach the first and second substrates; and
provides an electrical connection between the first and second substrates;
wherein the first substrate is a first battery tab, and the second substrate is one of a second battery tab and a battery terminal;
wherein the second substrate is the second battery tab, the method further comprising:
disconnecting the connector from the first and second battery tabs by heating the connector above the glass transition temperature of the shape memory polymer such that the connector transforms from the conforming shape to a permanent shape;
wherein disconnecting the connector disrupts the electrical connection between the first and second battery tabs; and
wherein transforming the connector from the conforming shape to the permanent shape exerts a detaching force on the first and second battery tabs.

2. The method of claim 1, wherein:
the conforming shape is a temporary shape of the shape memory polymer of the connector; and
the shape memory polymer in a permanent shape defines a generally arcuate shape of the connector.

3. The method of claim 1, wherein disconnecting the connector includes progressively peeling the connector from the first substrate and progressively peeling the connector from the second substrate.

4. The method of claim 1, further comprising:
reconnecting the connector to the first and second substrate by:
reheating the connector to a temperature higher than the glass transition temperature of the shape memory polymer; and
reapplying a load on the connector to transform the connector to a conforming shape while cooling the connector to a temperature lower than the glass transition temperature.

5. The method of claim 1, wherein:
the connector is configured as a multi-layer connector including a first adhesive layer, a second adhesive layer, and a third layer between the first and second layers;
the third layer includes the shape memory polymer;
the first adhesive layer, the second adhesive layer, and the third layer are electrically conductive;
the connector is positioned with the first adhesive layer adjacent to the first substrate and the second adhesive layer adjacent to the second substrate.

6. The method of claim 5, wherein each of the first adhesive layer and the second adhesive layer includes a dry adhesive.

7. The method of claim 5, wherein:
the connector includes a fourth layer between the second layer and the third layer;
the fourth layer includes the shape memory polymer;
when the shape memory polymer is in a permanent shape, the third and fourth layers are each configured as a generally arcuate shape and arranged to define a cavity therebetween; and
when the shape memory polymer is in a temporary shape, the third and fourth layers are configured in a conforming shape with the cavity substantially eliminated.

8. The method of claim 7, further comprising:
heating the connector above the glass transition temperature of the shape memory polymer to disconnect the connector;
wherein disconnecting the connector includes recovering the generally arcuate shape of the third and fourth layers and reopening the cavity; and
discontinuing the electrical connection between the first and second substrate.

9. The method of claim 1, further comprising:
detaching the connector from the first and second substrates, wherein the connector is reusable after the connector is attached.

10. A releasable battery tab connector, the connector comprising:
a first layer configured as an adhesive layer;
a second layer configured as an adhesive layer;
a third layer between the first and second adhesive layers, wherein the third layer includes a shape memory polymer having a glass transition temperature; and
wherein:
each of the first, second, and third layers is electrically conductive;
the connector in a permanent shape defined by the shape memory polymer includes a generally arcuate shape;
the connector in a temporary shape substantially conforms to a first substrate and a second substrate and attaches to the first and second substrates and provides an electrically conductive path between the first substrate and the second substrate;
the connector releases from the first and second substrates by heating the connector in the temporary shape above the glass transition temperature to detach the connector from the first and second substrates and disrupt the electrically conductive path between the first substrate and the second substrate; and
wherein:
the first substrate is defined by a first battery tab of a first battery cell;
the second substrate is defined by a second battery tab of a second battery cell; and
wherein transforming the connector from the temporary shape to the permanent shape to release the connector from the first and second battery tabs exerts a detaching force on the first and second battery tabs which increases separation between the first and second battery tabs.

11. The connector of claim 10, further comprising:
a fourth layer including the shape memory polymer and defined by a generally arcuate shape when the shape memory polymer is in a permanent shape;
wherein:
the fourth layer is electrically conductive;
the fourth layer is adjacent to the third layer and one of the first and second adhesive layers;
the third and fourth layers are arranged to define an opening therebetween when the connector is in the permanent shape; and
the opening is substantially eliminated when the connector is in the temporary shape.

12. The connector of claim 10, wherein the connector is configured to exert a detaching force when transforming from the temporary shape to the permanent shape sufficient to progressively peel the connector from the first substrate and the second substrate.

13. The connector of claim 10, wherein
the connector is removable after release from the first and the second battery tabs such that the connector is reusable after the connector is removed.

14. The connector of claim 10, wherein the connector is configured as a limit switch activated by heating the connector above a temperature limit corresponding to the glass transition temperature.

15. A battery pack comprising:
a first battery cell defining a first battery tab;
a second battery cell defining a second battery tab;
a reversible adhesive electrically conductive connector including a shape memory polymer;
wherein:
the connector is positioned between the first battery tab and the second battery tab;
the shape memory polymer of the connector in a permanent shape defines a generally curved shape;
the connector is transformable from the permanent shape to a temporary shape generally conforming to the first battery tab and the second battery tab by heating the connector to a temperature higher than a transition temperature of the shape memory polymer, and applying a load on the connector to transform the connector to the conforming shape while cooling the connector to a temperature lower than the transition temperature;
in the conforming shape, the connector forms an adhesive bond between the connector and the first and second battery tabs to operatively attach the first and second battery tabs and provide an electrical connection between the first and second battery tabs;
the connector is releasable from the first and second battery tabs by heating the connector in the temporary shape above the glass transition temperature to recover the permanent shape of the connector;
the connector is removable after release from the first and the second battery tabs such that the connector is reusable; and
the first and the second battery cells are recyclable after the first and second battery tabs are released from the connector.

16. The battery pack of claim 15, wherein the connector is configured as a multi-layer connector including:
a first adhesive layer;
a second adhesive layer;
a third layer between the first and second adhesive layers, wherein the third layer includes the shape memory polymer; and
wherein:
each of the first, second, and third layers is electrically conductive; and
the connector is configured to exert a detaching force when recovering the permanent shape sufficient to progressively peel the first adhesive layer from the first battery tab and the second adhesive layer from the second battery tab.

17. The battery pack of claim 15, wherein the connector is configured to disrupt the electrical connection between the first battery tab and the second battery tab when the connector is heated above a temperature limit of the battery pack corresponding to the glass transition temperature.

* * * * *